Sept. 2, 1958 J. WIJCHMAN 2,849,893

RECORDING DEVICE FOR MAGNETIC RECORDS

Filed Oct. 1, 1954 2 Sheets-Sheet 1

INVENTOR
JAN WIJCHMAN
BY [signature]
AGENT

Sept. 2, 1958 J. WIJCHMAN 2,849,893

RECORDING DEVICE FOR MAGNETIC RECORDS

Filed Oct. 1, 1954 2 Sheets-Sheet 2

INVENTOR
JAN WIJCHMAN
BY [signature]
AGENT

United States Patent Office 2,849,893 Patented Sept. 2, 1958

2,849,893

RECORDING DEVICE FOR MAGNETIC RECORDS

Jan Wijchman, Eindhoven, Netherlands, assignor, by mesne assignments, to North American Philips Company, Inc., New York, N. Y., a corporation of Delaware Application October 1, 1954, Serial No. 459,786

Claims priority, application Netherlands October 5, 1953

3 Claims. (Cl. 74—545)

The present invention relates to a control device for magnetic recording apparatus. More particularly, the invention relates to a recording and/or reproducing device for magnetic records on a tape or wire in which the speed of the tape or wire during the winding operation is higher than that during the recording or reproducing operation.

According to the invention the device comprises only one control knob by means of which all mechanical and electrical commutations required for a particular operational condition are carried out. Thus, an extremely simple control of the device is obtained as opposed to known devices comprising a plurality of control knobs, wherein in a particular operational condition of the device the positions of the control-members do not correspond to one another unless the various control-members can be locked relative to one another.

In a preferred embodiment of the invention, the control knob is seated on a shaft journalled in the device so as to be rotatable only on its direction of length. In the direction of rotation the connection between the knob and shaft is rigid; in the longitudinal direction of the shaft, however, the knob is displaced over a given distance; in a tangential and an axial direction the shaft is provided with profiled control members. Such control members, shaped, for example, in the form of discs, permit the performing of the various mechanical commutations, for example, the release of the brakes for the winding up reel and the winding-off reel, the interruption of the engagement between the tape and the tone coil, for example, by lifting a pressure roller, and the coupling or decoupling at will of a driven motor with one of the reels, for instance, by means of a displaceable intermediate wheel. Moreover, such control members permit the control of one or more electric switches, for example the main switch between the power source and the device, a switch for the amplifier, a motor-switch and a switch for the supply to the various recording and reproducing heads. According to a further aspect of the invention, the control knob can occupy a plurality of positions in the direction of rotation, each position corresponding to a particular operational condition of the device. The control of the device is thus extremely simple. The various operational conditions of the device according to the invention may, for example, be; a full "off"-position in which the main switch between the source of power supply and the device is open, a second "off"-position in which the main switch and the switch for the amplifier are closed, the motor switch, however, being open, so that then the amplifier can be used separately, a position for rewinding, a position for forward winding, a position for reproduction, a position for recording through pick-up or radio, and a position for recording through microphone. Since, in accordance with a further aspect of the invention, the control-knob is kept by spring force in an extreme position on the shaft, viewed in the direction of length of the shaft, there is a possibility of passing by particular operational conditions in which the position of the tape is varied or the record already provided is erased, simply by turning the control knob, the operational position not being occupied or it being simply impossible to occupy this position. According to a further aspect of the invention, in the extreme position of the control knob held by spring force a stop prevents rotation into the position corresponding to the condition in which any records on the tape are erased, the stop being released by moving the control knob against the spring force. Such a stop may be provided on the knob itself and/or on a part of the structure of the device. The operator is thus reminded of the fact that by turning the control knob into the recording position irreparable consequences are involved, i. e. the erasure of any records already made on the tape. Moreover, if uninitiated persons turn the control knob there will not be irreparable effects. The construction of the control knob according to the invention, being held by spring force in the extreme position, permits the holding of the winding-off reel by braking effect in the winding position occupied in the direction of rotation. In addition, by moving the control knob against the spring force, the braking effect may be stopped with the aid of a control member secured to the knob itself. Thus, the control knob may pass by the position corresponding to the winding position of the device without any movement of tape taking place.

In order that the invention may be readily carried into effect, it will now be described with reference to the accompanying drawing, wherein.

Figures 1, 2:
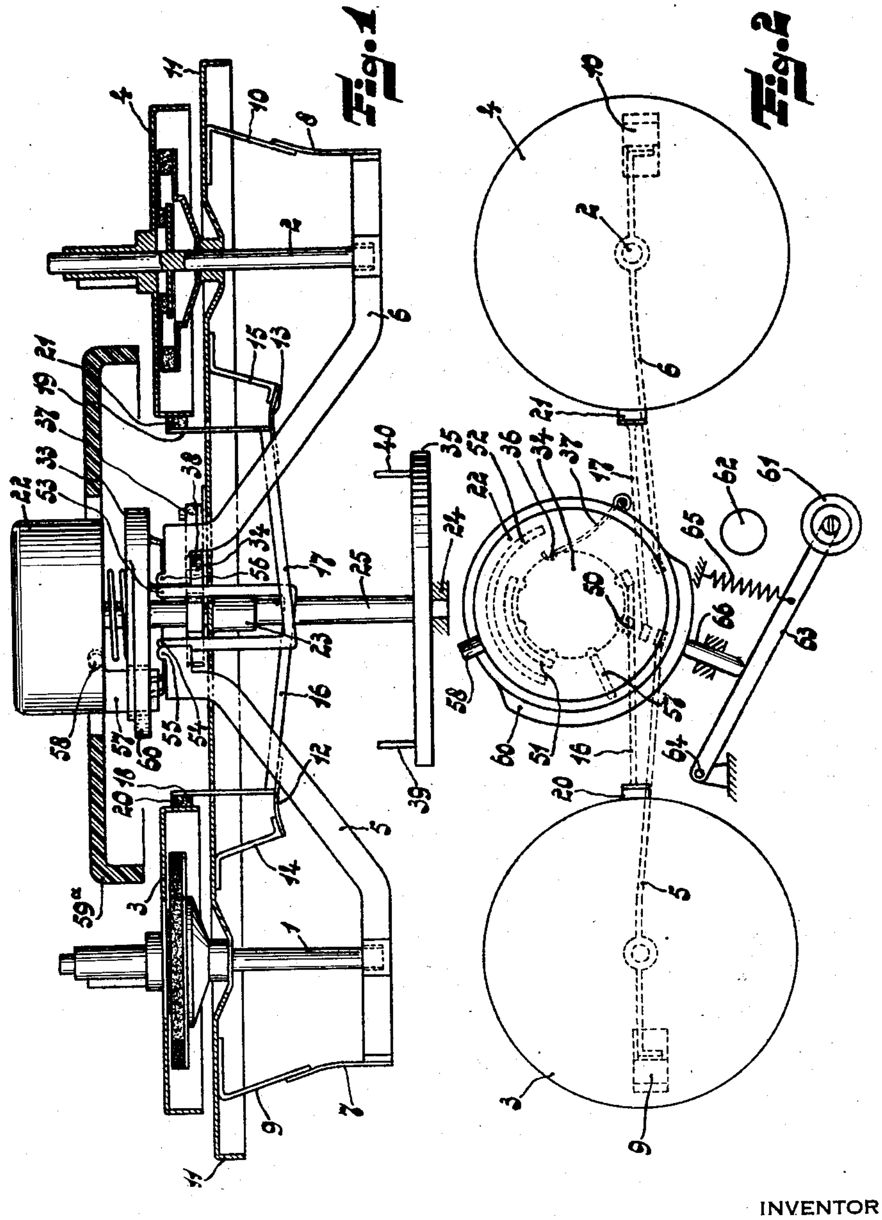
Fig. 1 is a sectional view of an embodiment of a device according to the present invention.
Fig. 2 is a plan view of the embodiment of Fig. 1.

Figs. 1 and 2 show two inverted dished members 3 and 4 driven by means of shafts 1 and 2, respectively; to these members can be secured tape or wire reels (not shown) in known manner so as to be rigid in the direction of rotation. The dished members 3 and 4 may be driven as is described in United States patent application Serial Number 460,391, filed October 5, 1954, and now abandoned. The shafts 1 and 2 are journalled on arms 5 and 6, respectively, which are secured to a base plate 11 of the device by means of resilient strips 7 and 8, respectively, with the aid of corner pieces 9 and 10, respectively. The resilient strips 7 and 8 allow the arms 5 and 6, respectively, to move in the plane of the drawing, the shafts 1 and 2 being moved in their directions of length. The arms are proportioned and mounted so that they, and hence the shafts 1 and 2, tend to occupy the highest positions. As is described in the aforesaid patent application, the highest positions of the shafts 1 and 2 correspond to driving of the dished members 3 and 4, respectively, by means of a slip coupling having a small torque. The lowest positions of the shafts 1 and 2 correspond to driving of the members 3 and 4, respectively, by means of a slip coupling having a high torque. To the base plate 11 are also secured brakes 16 and 17, respectively, cooperating by means of resilient strips 12 and 13, respectively, with the aid of corner pieces 14 and 15, respectively, with the members 3 and 4, respectively. The brakes 16 and 17 are constituted by an arm 18 and 19, respectively, to which braking material 20 and 21, respectively, is secured. The resilient strips 12 and 13 also allow the brakes 16 and 17, respectively, to move in the plane of the drawing and tend to urge the braking material 20 and 21, respectively, against the members 3 and 4, respectively.

Figure 4:
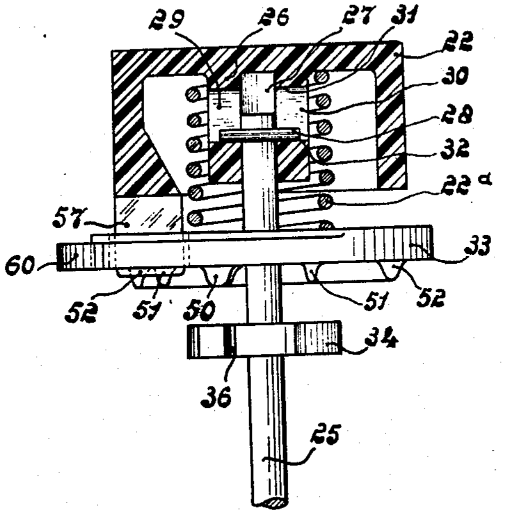
Fig. 4 is a sectional view of the control knob 22 of the embodiments of Figs. 1 and 2.

A control knob 22 is provided over the base plate 11 and is seated on a shaft 25 journalled in the device so as to be rotatable in the bearings 23 and 24 only in its direction of length. The connection between the control knob 22 and the shaft 25 is such that it is rigid in the direction of rotation (see Fig. 4), the knob being, however, displaceable over a given distance in the direction of length of the shaft. In this connection, the central part 26 of the control knob 22 is provided with a bore 27 in which lies the end of the shaft 25. Through this end is introduced a stud 28, which lies in slots 29 and 30, each being provided on one side of the central part 26 of the knob. Thus, a rotation of the knob 22 is transmitted by means of the stud 28 to the shaft 25, and during movement of the knob 22 in the direction of length of the shaft 25 the stud 28 can slide into the slots 29 and 30. The latter movement of the knob 22 relative to the shaft 25 is confined by stops 31 and 32 against which the stud 28 abuts. A control-disc 33 is seated rigidly on the shaft 25. A spring 22A enclosed between the disc 33 and the knob 22 biases the knob to its extreme top position relative to the shaft 25. On the shaft 25 are seated two other discs 34 and 35 (Fig. 1). The disc 34 is provided with notches 36, the number of which corresponds to the number of positions of the knob 22 in the direction of rotation. In order to fix these positions, a spring 37 cooperates with the notches 36 in a manner such that the free end 38 of the spring lies in one of the notches 36 for each position of the disc 34 and hence of the knob 22, each position corresponding to a given operational condition of the device. The disc 35 is provided with studs 39 and 40, by means of which by rotating the knob 22 switches (not shown) can be commutated; to this end the switches are arranged around the shaft 25. The disc 35 may moreover be profiled in a radial direction in order to disengage the driving connection between a motor and the device, for example, by disengaging a friction wheel from the shaft of the driving motor or from the part of the device to be driven.

The control disc 33 is provided on the bottom side with control lugs 50, 51 and 52. The lugs 50 and 51 are intended to cooperate with an extension 53 of the brake 16; the lug 52 is intended to cooperate with an extension 54 of the brake 17. The extensions 55 and 56 of the arms 5 and 6, respectively, are also located below the disc 33. A lug 57 cooperates with these extensions and is secured to the knob 22, however, only when the knob 22 is depressed. In a radial direction, the spring 37 extends so far that the extensions 53 and 54 may also be affected, however, only in the depressed state of the knob 22. The knob 22 is also provided with a lug 58, which strikes a stop 59 in a given position of the knob 22. The stop 59 is secured to a protection cap 59A of the device (see Fig. 3). Depression of the knob 22, frees the lug 58 from the stop 59 and allows said lug to turn below it.

The control disc 33 is provided in a radial direction with a lug 60 for urging away a pressure roller 61 from a transport roller 62 for the tape or wire in given operational conditions of the device. The pressure roller 61 is journalled on an arm 63 which is secured pivotably at point 64 to the structure of the device. A spring 65 tends to urge the pressure roller 61 against the transport roller 62. Between the arm 63 and the lug 60 provision is made of a strip 66 which is movable along its central axis in a manner such that the pressure roller 61 engages or disengages the transport roller 62 by turning the knob 22.

Figure 3:
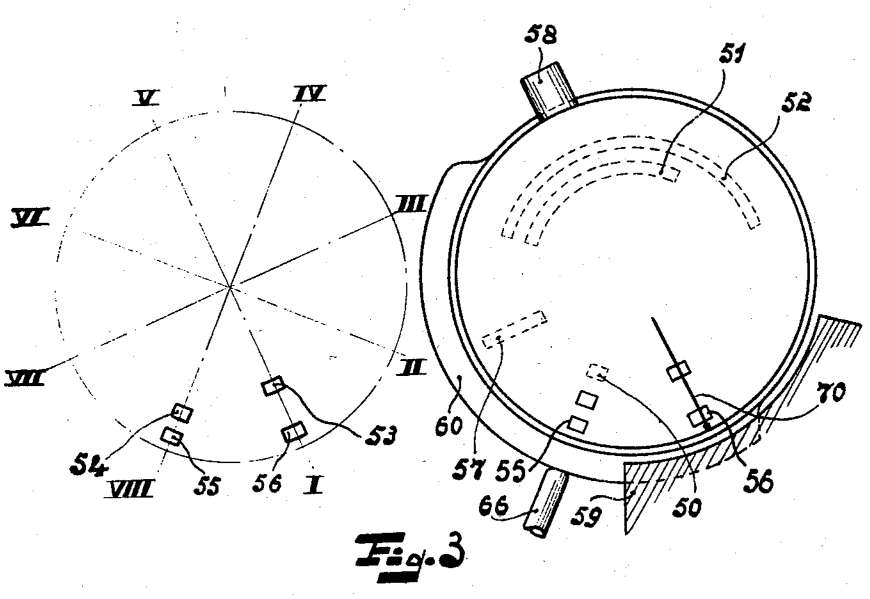
Fig. 3 is a schematic diagram of the positions of the axial profilations of the control member relative to the parts of the device to be controlled.

With reference to Fig. 3, the left-hand part of which shows the positions of the extensions 53, 54, 55 and 56 in a diagram, the right-hand part of which shows the positions of the control-lugs 50, 51 and 52 on the control disc 33 and the position of the lug 57 of the knob 22, the various positions of the knob 22 and corresponding operational conditions of the device will now be described. It is assumed that the knob 22 in the position shown in the right-hand part of Fig. 3 is located over the extensions 53, 54, 55 and 56, the arrow 70 corresponding to position I of the left-hand part of Fig. 3. In position I, the extensions 53 to 56 are free from the lugs 50, 51 and 52, while lug 60 engages the strip 66, so that the pressure roller 61 is free from the transport roller 62. The electric switches are open in this position, so that in position I of the knob 22, the device is completely out of operation.

If the knob 22 is turned to the position II, the pressure roller 61 remains free from the transport roller 62, the motor switch is on and the extension 53 is urged down by the lug 50, so that the brake 16 is loosened. The members 3 and 4 are driven in opposite directions with equal torque so that in this position no movement of tape or wire takes place. However, the lug 57 is then located over the extensions 54 and 55 and is free from said extensions. By depressing the knob 22, the extensions 54 and 55 are urged down, so that the brake 17 is released and the arm 5 occupies its lower position, so that the member 3 is driven with a great amount of torque. The tape or wire is thus wound from the right-hand reel onto the left-hand reel if the knob 22 is depressed. If the knob 22 is released, the extensions 54 and 55 move upwardly. The driving of the two reels is again effected by equal forces and the brake 17 brakes the member 4 so that the tape is stopped rapidly.

In position III of the knob 22 the lug 52 urges the extension 54 downwardly, the brake 17 is thus released, the extension 53 is free, so that the brake 16 brakes the member 3. The lug 57 then lies over the extensions 53 and 56. Depression of the knob 22 results, as in position II, in the depression of the extensions 53 and 56, so that the tape or wire is wound from the left-hand reel onto the right-hand reel. By releasing the knob 22 the tape is stopped in the manner described above.

In position IV of the knob 22 both the extensions 53 and 54 are urged down by the lugs 51 and 52, respectively. Moreover, the strip 66 is now free from lug 60, so that the pressure roller 61 engages the transport roller 62. The tape or wire is clamped between the rollers 60 and 61, so that a slow movement of tape from the left to the right takes place. The switches may be adjusted in this position so that records on the tape or wire are reproduced.

The further rotation of the knob 22 into position V is prevented by the abutment of lug 58 against stop 59. This remainds the operator of the fact that in position V any records on the tape or wire have been erased. The knob 22 may be turned further only when it is depressed, the lug 58 being then free from stop 59. This depression does not result in any effect from lug 57, since all extensions 53 to 56 are free from this lug. The pressure roller 61 engages the transport roller 62 in this position of the knob 22. However, the lugs 51 and 52 depress the extensions 53 and 54 so that the brakes 16 and 17 are released. In this position, the switches may be adjusted so that records may be made directly from a radio receiver or a pick-up.

The position VI of the knob 22 does not exhibit mechanical differences from position V. Only the switches occupy different positions which are suitable for recordings by means of a microphone.

In positions VII and VIII all extensions 53 to 56 are free from the lugs 50, 51 and 52. The only difference is that in position VII the pressure roller 61 engages the transport roller 62 and in position VIII said rollers are disengaged. In these positions, the motor may be disconnected electrically from the power supply source by the switches, while the amplifier is switched on and may be used separately.

While I have shown and described the preferred embodiment of my invention, it will be understood that my invention may be embodied otherwise than as herein specifically illustrated or described, and that in the illustrated embodiment certain changes in the details of construction and in the arrangement of parts may be made without departing from the underlying idea or principle of the invention within the scope of the appended claims.

What is claimed is:

1. A recording device for an elongated magnetic recording medium wherein the speed of the medium during winding exceeds the speed of the medium during recording, comprising supporting means, a single control knob, a shaft journalled in said supporting means for only rotatable movement on its longitudinal axis thereon, said control knob being seated on said control shaft, said knob being immovable relative to said shaft in a direction transverse to the longitudinal axis of said shaft but displaceable over a given distance in a direction parallel to said longitudinal axis, said control knob selectively occupying a plurality of positions around the circumference thereof, each of said positions corresponding to a given operational condition of said device, and a plurality of control members on said shaft provided with a plurality of projections for activating a series of alternate operating conditions for said recording device, each of the series of operating conditions being independently operable by engagement therewith of selected projections on said control members.

2. A recording device for an elongated magnetic recording medium wherein the speed of the medium during winding exceeds the speed of the medium during recording, comprising supporting means, a single control knob, a shaft journalled in said supporting means for rotatable movement on its longitudinal axis thereon, said control knob being seated on said shaft, said control knob being immovable relative to said shaft in a direction transverse to the longitudinal axis of said shaft but displaceable over a given distance in a direction parallel to said longitudinal axis, said control knob selectively occupying a plurality of positions around the circumference thereof, each of said positions corresponding to a given operational condition of said device, a plurality of control members on said shaft provided with a plurality of projections for activating a series of alternate operating conditions for said recording device, each of the series of operating conditions being independently operable by engagement therewith of selected projections on said control members, and a compression spring normally biasing said control knob in the direction of the longitudinal axis of said shaft and away from said control members.

3. A recording device for an elongated magnetic recording medium wherein the speed of the medium during winding exceeds the speed of the medium during recording, comprising supporting means, a single control knob, a shaft journalled in said supporting means for rotatable movement on its longitudinal axis thereon, said control knob being seated on said shaft, said control knob being immovable relative to said shaft in a direction transverse to the longitudinal axis of said shaft but displaceable over a given distance in a direction parallel to said longitudinal axis, said control knob selectively occupying a plurality of positions around the circumference thereof, each of said positions corresponding to a given operational condition of said device, a plurality of control members on said shaft provided with a plurality of projections for activating a series of alternate operating conditions for said recording device, each of the series of operating conditions being independently operable by engagement therewith of selected projections on said control members, a compression spring normally biasing said control knob in the direction of the longitudinal axis of said shaft and away from said control members, and a stop element for holding said control knob by said compression spring in one position of the said control knob and for preventing rotation of the said control knob to a position corresponding to at least one operational condition of said recording device, said stop element being released by movement of said control knob against the force of said compression spring.

References Cited in the file of this patent

UNITED STATES PATENTS

| | | |
|---|---|---|
| 1,839,908 | Weatherhead | Jan. 5, 1932 |
| 2,039,093 | Lewis | Apr. 28, 1936 |
| 2,051,181 | Saar | Aug. 18, 1936 |
| 2,463,513 | Brubaker | Mar. 8, 1949 |
| 2,588,650 | Morse | Mar. 11, 1952 |